United States Patent [19]
Jenson

[11] Patent Number: 5,899,169
[45] Date of Patent: May 4, 1999

[54] AUTOMATIC HAY, GRAIN AND PELLET FEEDER FOR LIVESTOCK

[76] Inventor: Bernard T. Jenson, 34762 Powder River Pl., Fremont, Calif. 94555

[21] Appl. No.: 08/960,518

[22] Filed: Oct. 29, 1997

Related U.S. Application Data

[60] Provisional application No. 60/030,138, Nov. 4, 1996.

[51] Int. Cl.$^6$ ................................ A01K 5/00; A01K 1/10
[52] U.S. Cl. .................................... 119/51.13; 119/51.11; 119/56.1
[58] Field of Search ............................ 119/51.11, 51.12, 119/51.13, 56.1, 58; 222/650

[56] References Cited

U.S. PATENT DOCUMENTS

| | | | |
|---|---|---|---|
| 3,683,859 | 8/1972 | Kirk | 119/51.13 |
| 3,845,744 | 11/1974 | Carr et al. | 119/51.13 |
| 3,900,008 | 8/1975 | Jinnette | 119/51.13 |
| 4,665,863 | 5/1987 | Toledo | 119/51.13 |
| 5,345,893 | 9/1994 | Morris | 119/51.11 |
| 5,394,832 | 3/1995 | Briley | 119/58 |
| 5,447,120 | 9/1995 | Eberhardt | 119/51.13 |
| 5,520,143 | 5/1996 | Duin | 119/51.13 |

*Primary Examiner*—Michael J. Carone
*Assistant Examiner*—James S. Bergin

[57] ABSTRACT

A machine for storing and automatically dispensing a premeasured quantity of hay, grain, pellets and food supplements to single or multiple livestock type animals at predetermined times. Comprised of a enclosure containing a plurality of compartments each having the capacity of storing an amount of food for one feeding for either a single animal or multiple animals. A plurality of horizontally mounted doors, one per compartment, affixed to the enclosure frame on one side by means of a hinged joint. Opposite the hinged joint, a spring loaded latch bolt mechanism is affixed to the door. The hinged joint allows the door to fall by gravity into a vertical position allowing the feed to fall into a integral hayrack and trough located directly below the feed compartments. The horizontal doors are opened electrically, utilizing a electric door opener affixed to the support structure at each door position, aligned as to mate with a latchbolt attached to the horizontally mounted hinge door, which when energized allows the door strike to pivot free from its closed position. This allows the door to swing down dispensing its charge of feed. The timing and sequencing used to open the feed dispensing doors automaticly on a selected predetermined feeding schedule is accomplished utilizing a solid state Programmable Logic Controller. The animal owner selects a feeding schedule with a selector switch. A portable computer can be used in the event programing needs to be modified.

1 Claim, 4 Drawing Sheets

AUTOMATIC HAY, GRAIN AND PELLET FEEDER FOR LIVESTOCK

CROSS REFERENCES TO RELATED APPLICATIONS

This is an application for a Non-provisional Utility Patent.

A Provisional Patent Application was filed on Nov. 11, 1996 with the United States Dept. of Commerce Patent and Trademark Office complete with the correct fees.

This application claims the benefit of Provisional Patent Application Ser. #60/030,138, filed Nov. 04, 1996.

BACKGROUND

1. Field of the Invention

This invention relates to animals and livestock such as horses, cattle and other domestic animals, which eat hay, grains or pelletized food as a diet. Specifically it addresses a concern of animal owners as to how to feed their animals in their absence.

2. Description of the Prior Art

Horses and other domestic livestock should be fed twice per day, preferably once in the morning and once in the afternoon/evening. It is also desirable that these feedings occur at the same times each day. Sometimes this is difficult for the animal owner due to work schedules, vacations away from home or inclement weather.

Many animal owners like to feed their animals grains, supplements or pelletized food In addition to hay. They either feed them these items as a substitute for hay or they add these items to a meal of hay.

In my search for prior art I discovered (3) patents issued for devices attempting to address the feeding of hay automatically. U.S. Pat. No. 5345893 by Morris (1994), U.S. Pat. No. 4665863 by Toledo (1987) and U.S. Pat. No. 5520143 by Duin (1996).

All three of these inventions use a complicated means of opening doors to allow hay to be dispensed.

Their series of bars, gears, actuators and shafts lend themselves to wear due to friction of all these moving parts.

Because of their design they could also be limited to the amount of hay they could dispense. This is due to the force and energy required caused by additional weight on the friction surfaces, specifically; the "sequencing bar" of Duin (U.S. Pat. No. 5,520,143, 1996) and the "latch rod" or latching tabs of the mechanism by Morris (U.S. Pat. No. 5,345,893, 1994). In both cases the weight of the door as well as that of the hay sits directly upon a bar or tab which must slide linearly or circularly against the force and friction of the weight.

The prior inventions use a series of indexed slots or tabs which can prove to be time consuming and awkward when trying to align them to reset the doors when refilling the feeder with hay.

The mechanical components used to open the dispensing doors are custom fabricated/manufactured. Thus the only recourse a consumer would have for replacement or repair would be from the manufacturer. If for some reason the manufacturer could not deliver the component, the consumer would be forced to seek out a machine shop for custom fabrication of the component.

The inventions of Morris and Duin dispense the hay directly onto the ground or a chute, which diverts the hay to the ground. This design makes it impractical to dispense grain, pellets or other food supplements either alone or with the hay as the product would be dispersed onto the ground making it difficult for the animal to recover and ingest.

There is also a safety concern related to feeding horses hay dispensed/placed directly onto the ground. It can be contaminated with water, mud, dirt or sand. If a horse ingests dirt or sand with its hay there is the possibility of contracting Colic, a potentially fatal condition.

Neither Duin or Morris' feeders address the safeguarding of the animal, or people from potential harm caused by coming into contact with one of the doors when they are swinging/opening.

Duin uses a chute, which extends out to direct the falling hay to the ground. This chute could be a potential tripping hazard.

Many livestock owners own more then 1 head; it would be most desirable to feed more then one animal at a time with the same feeder. Dispensing the flake of hay onto the ground in one piece prohibits this because the most dominant animal will become gluttonous and prohibit the other animals from eating.

OBJECTS AND ADVANTAGES

Accordingly, several objects and advantages of my invention are:

My invention provides a simple means of latching the feed doors. Incorporating an electric door strike that when energized allows the feed doors to fall open by gravity and thereby reducing moving parts.

All of the latching components are standard door hardware items available at some hardware stores or available from most electrical or industrial supply vendors at relatively low cost. This means the consumer is not restricted or limited to purchase replacement components from the manufacturer of the feeder but has the option to purchase these items from any vendor providing the best price and delivery.

The force and energy required to unlatch the feed doors is not affected by the weight of the feed. This is due to the design of the electric door strike, which upon receiving a short low voltage impulse, the strike drops down out of the way and allows the feed door to fall by gravity. This is in contrast to twisting or sliding the latching mechanism against the weight of the door, as is the case with the other patents.

No sequencing or alignment is necessary to reset (close) the feed doors as each door is controlled independently without relying upon any type of common linkage arrangement between the doors. The feed doors have a spring-loaded latch bolt attached which when closed is retained by the electric strike.

My invention includes an integral hayrack consisting of bars; rods, tubes or pipes mounted longitudinally and spaced aprox. 5" apart. This hayrack serves several purposes:

"It" protects the animal and the owner from coming into contact with the swinging doors avoiding possible injury.

"It" keeps hay elevated off of the ground, avoiding contamination and possible health risks to the animal.

When the hay drops from the above compartments, the rack acts to break up the flake and distribute the hay to both sides of the feeder. This allows more than one animal to eat at the same time without concern of a more dominant animal hoarding all the food.

My invention also includes an integral trough or receptacle below the hayrack. This receptacle is designed to retain grain, pellets or any other granular type supplements to the animals diet. This feeder is not limited to the feeding of just hay but is capable of timed automatic dispensing of any common feed separately or simultaneously In addition, the means of latching and the timing—are superior to any prior art in the following ways:

The feed doors latching mechanisms are controlled independently of one another and do not depend on a common linkage with other doors, making it feasible to manufacture units having differing capacities, compartments or different configurations utilizing the same latching components. This reduces the amount of inventory required for manufacturing units of differing capacities or configuration.

The feeder can consist of any number of food storage compartments in various sizes And various configurations including a singular compartment and feed door or Multiple compartments and feed doors.

Multiple individual feeding units can be installed at different stalls, pens, corrals or barns and be controlled by a single Control panel or individual control panels.

Due to the independent operation of the feed dispensing doors it is possible to manufacture the feeder in a modular fashion, thus further reducing manufacturing costs due to set up, tooling and inventory costs. This also makes it practical to add a feeder module to an existing unit if the consumer requires additional capacity.

Still further objects and advantages will become apparent from a consideration of the ensuing description and accompanying drawings.

BRIEF DESCRIPTION OF THE DRAWINGS

In the drawings, closely related figures have the same number but different alphabet suffixes.

SUMMARY

In accordance with the present invention, an "Automatic hay, grain and pellet feeder for livestock" comprises of a compartmentalized enclosure with hinged feed dispensing doors, electric door strike latching mechanisms, integral hayrack and receptacle for catching and retaining feed as well as a timing means for automatic feeding on a predetermined schedule.

DESCRIPTION

Figure 1:
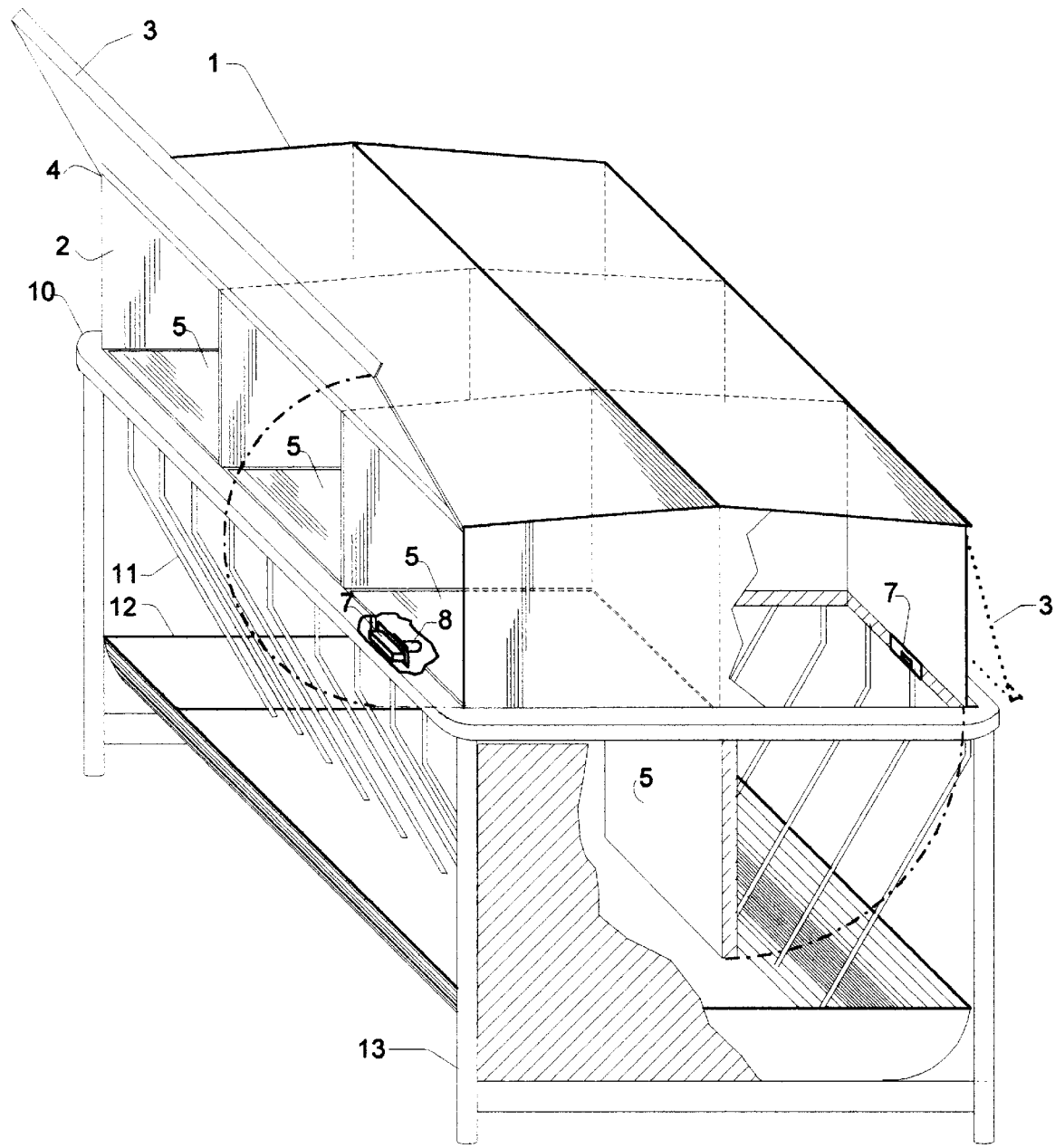
FIG. 1 is a perspective view of my invention. An automatic hay, grain and pellet feeder. Figure shows a feeder with 6 compartments.

A typical embodiment of an Automatic Hay Grain and Pellet feeder ("Feeder") for livestock is illustrated in FIG. 1 a perspective view. The "feeder" is comprised of an enclosure 1 and plurality of compartments 2 to segregate premeasured portions of feed each having a "feed dispensing door" 5 mounted horizontally at the bottom of the compartment. Each feed dispensing door is hinged 6 on one end and has a spring-loaded latch bolt mechanism 8 on the opposite end. The compartments are accessible by hinged access doors 3 for filling.

Figure 3A:
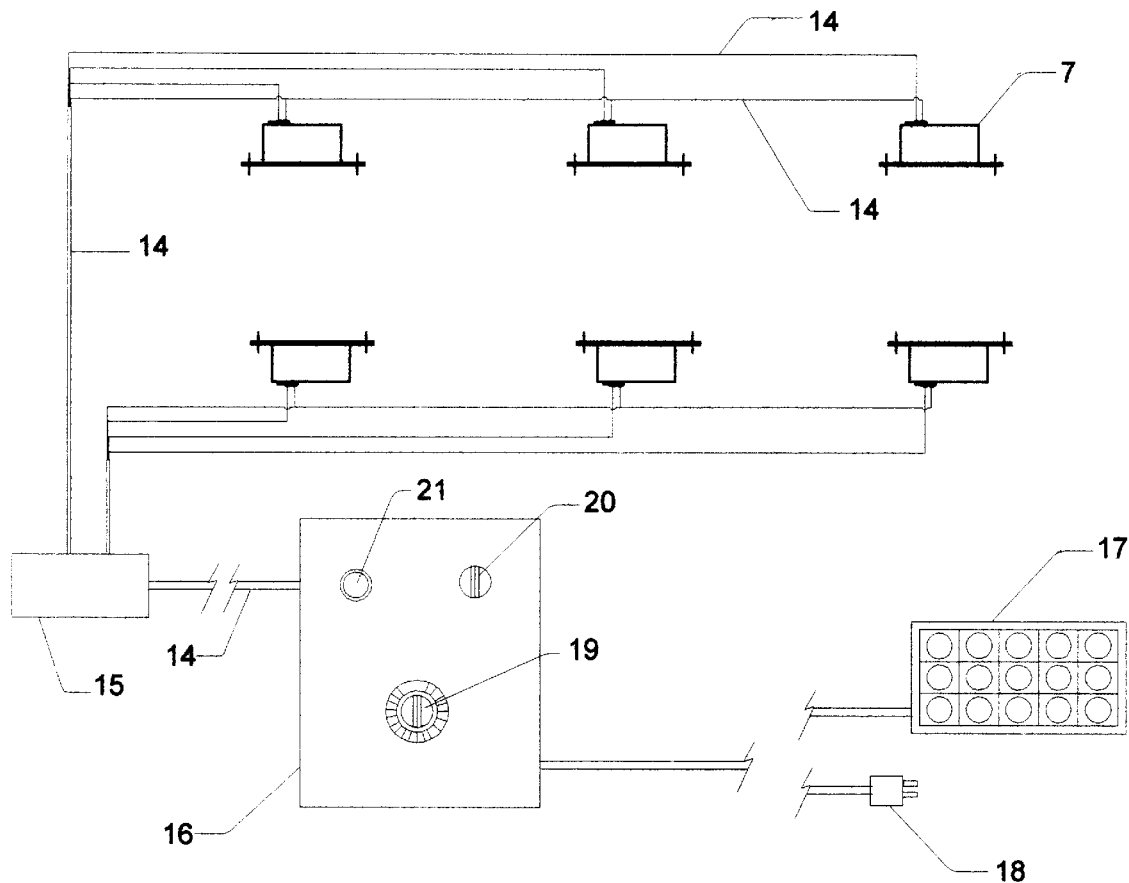
FIG. 3A Shows a wiring diagram.
Figure 3B:
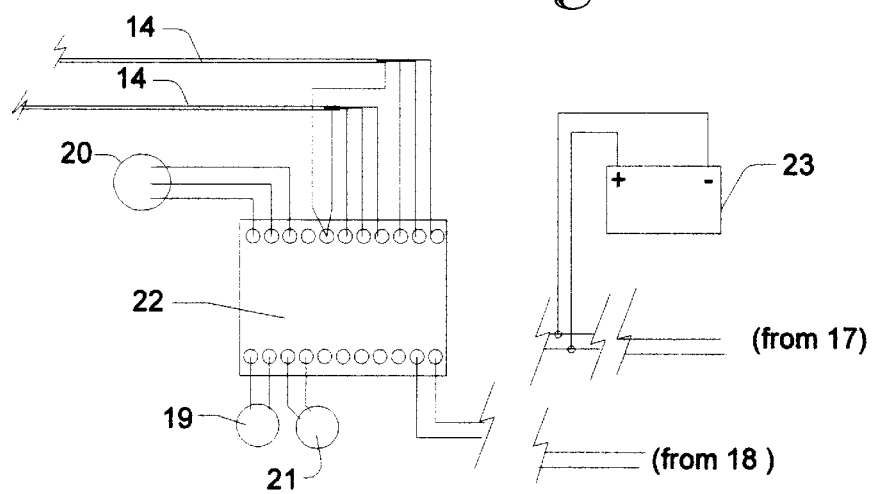
FIG. 3B shows the components that are installed in the "control panel" which is shown in FIG. 3A.
Figure 4:
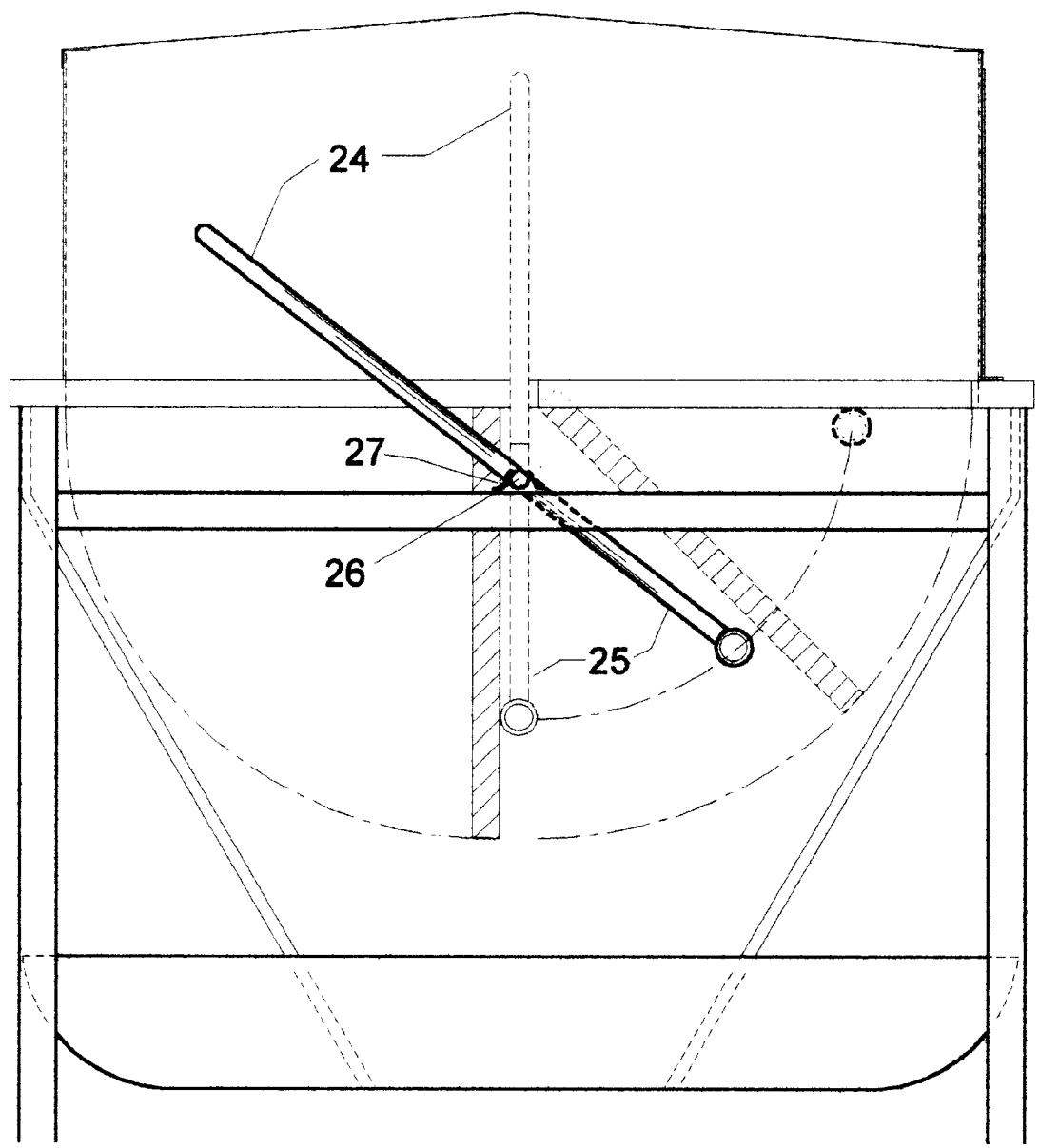
FIG. 4 shows an end view of the feeder with a manual "Door closer" used for closing multiple doors at once Reference Numerals 1  Enclosure
2  Compartment separation wall
3  Hinged compartment access door
4  Access door hinge
5  Hinged feed dispensing door
6  Feed dispensing door hinge
7  Electric door strike mechanism (full mortise type shown)
7B  Pivoting strike
8  Spring loaded latch bolt mechanism
8A  Latch bolt
8B  Latch bolt spring
10  Support frame, also used as conduit for low voltage wiring
11  Integral Hayrack
12  Integral receptable/trough -continued Reference Numerals 13  Support legs
14  Low voltage wiring
15  Junction box mounted on feeder
16  Control panel remote mounted
17  Solar panel
18  110 volt power connection
19  Spring wound "delay" timer
20  Feeding schedule selector switch
21  Push to test button
22  Process logic controller (PLC)
23  24 volt battery
24  lever for resetting (closing) multiple doors
25  cantilevered bar suspended from shaft 26
26  horizontally mounted shaft
27  shaft bearing

The enclosure, compartments and feed dispensing doors which can be made from metal, plastic or other suitable material are affixed to a sturdy tubular frame 10 Which is also used for routing low voltage wiring 14 (FIG. 3) to an Electric door strike 7 available from The Edwards Company, Farmington, CT. this latching mechanism is affixed to the frame either in full mortise fashion or surface mounted at each feed door position, it is aligned so as to mate with the spring loaded latch bolt mechanism mounted on the feed door, securely latching the door until energized.

Integral to the frame 10 is a hayrack 11 consisting of rods or tubes spaced aprox. 5" apart in a vertical arrangement to retain and distribute the hay as it drops from the compartments. A feed receptacle/pan 12 with its edges turned up to catch and retain granular type feed such as grain or pellets is mounted directly below the hayrack.

(FIG. 3A & 3B) A weatherproof junction box 15 for field wiring is attached to the feeder. A control panel 16 is provided for remote mounting. The control panel consists of a weatherproof enclosure, a process logic controller (PLC) 22, a "push to test" button 21; a schedule selection switch 20 and a spring wound sequenceinitiating timer 19.

Power requirement for the electric door strikes is 24 VDC, this is accomplished either by battery 23 with a solar panel 17 charging system as a power source or an internal transformer built into the PLC that transforms 110 AC 18 into 24 VDC.

OPERATION

One first closes the Feed Doors 5 by grasping the individual doors by hand and pivoting them upward on their hinges until the spring loaded latch bolt 8A engages the electric door strike 7. Another option in closing multiple doors is by rotating a lever 24 located on the end of the unit 90 deg. In where a cantilevered bar 25 extending from a shaft 26 connected to the lever and which rotates in a bearing 27 surface and extends the length of the unit comes into contact with the doors pivoting them into the closed position.

After the feed doors have been closed one opens the hinged compartment access door(s) 3. A pre-measured amount of Hay, grain, pellets or other diet supplements are then placed onto the feed doors 5 in the individual compartments. Each compartment equals one feeding, for example if it is desired to feed two horses at the same time one would load each compartment with two flakes of hay and/or two portions of any other common granular type feed. One then closes the compartment access doors 3.

After the feed compartments have been filled, a feeding schedule is selected (generally either every 12 hours or every 24 hours) by means of a selector switch 20, the beginning time for the desired feeding cycle is initiated by means of a spring wound timer 19 which is rotated to select the hour of the first feeding. The rest of the cycle is fully automatic in that a preprogrammed PLC 22 will control sequencing and voltage output to the individual electric door strikes 7.

Figure 2A:
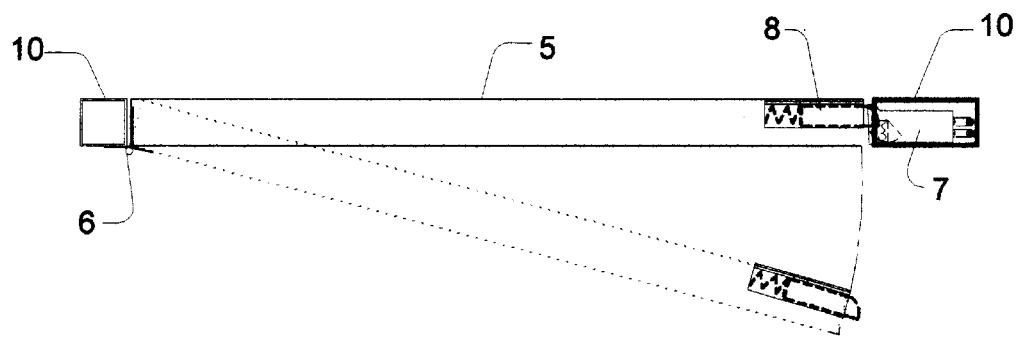
FIG. 2A shows the "feed dispensing door" and latching mechanism in section view including a partial arc of the door swinging.
Figure 2B:
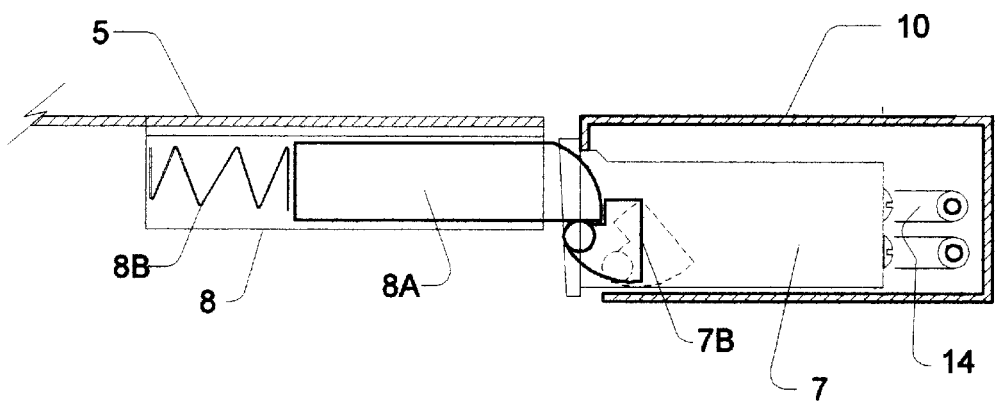
FIG.2B is an enlarged section view showing the "electric door strike" as installed in a frame including the pivot positions of the strike. As well as a spring loaded latching bolt fixed to the "Feed dispensing door".

Upon reaching the selected feeding time, the PLC sends a 2 second 24VDC impulse to the appropriate electric door strike (solenoid) 7. This causes the strike to pivot down out of the way FIGS. 2A, 2B, allowing the feed door latch bolt and door to swing past it thereby dropping its charge of feed into the hayrack 11 and receptacle 12. The feed is distributed to two opposite sides of the feeder facilitating the feeding of multiple animals if required.

CONCLUSIONS, RAMIFICATIONS, AND SCOPE

Accordingly, it can be seen that this invention addresses the concern of animal owners as to how to properly feed their animals in their absence. My invention is capable of automatically dispensing hay, grain, pellets or other type of granular food either separately or simultaneously on a pre-determined schedule for multiple feedings. It is not limited to just hay or just granular type feed. Furthermore the feeder has the additional advantages in that

- It provides an integral hayrack and receptacle/trough directly below the feed compartments and elevated above the ground to capture the desired feed when it is released from the compartments. This reduces the possibility of contamination of the feed by water, dirt or sand. The receptacle/trough also acts to contain granular type feed for easy retrieval and ingestion by the animal.
- It provides distribution of the feed so that more then one animal can be fed simultaneously without concern of a more dominant animal hoarding all of the food.
- It provides protection to the animal and consumer against possible contact with the swinging feed doors when they are opening, thus avoiding possible injury from impact.
- It provides a simple time proven latching mechanism for opening of the feed doors, which permits independent control of individual doors. And thereby reducing moving parts and inherent wear.
- The feed doors latching mechanisms are controlled independently of one another and do not depend on a common linkage with other doors, making it feasible to manufacture units having differing capacities, compartments or different configurations utilizing the same latching components. This reduces the amount of inventory required for manufacturing units of differing capacities or configuration.
- It is not susceptible to weight restrictions as it applies to any increased energy or force required due to friction losses resultant of sliding, twisting or rotating a latch against the additional weight of the feed and its door.
- It gives the consumer a choice of where to obtain replacement components as all latching and timing components are standard items readily available from their respective suppliers.
- It provides protection of the stored food from weather, birds and other wild animals. It also secures the food from the domestic animal until the designated feeding time.
- It provides a Programmable Logic Controller (PLC) as the means of timing and sequencing of the opening of the feed doors. The PLC has proved its reliability for many years in the control of all types of processes. The programming can be loaded into the PLC prior to shipment from the feeder manufacturer. It has no moving parts and will retain it's programming in the event of a power failure. The consumer has a choice of selecting a schedule from a menu of preprogrammed options by means of a selector switch or may edit the programming by means of a laptop computer, a hand-held programming device provided by the PLC manufacturer or remotely by modem.
- It provides protection from electrocution hazard as the working components of the feeder require low amperage, low voltage power to operate the latching mechanisms. Any higher voltage (110VAC) is limited as the power source of the control panel, which can be located in a protected remote location with low voltage interconnecting wiring between the control panel and the feeder.

Although the description above contains many specificities, these should not be construed as limiting the scope of the invention but as merely providing illustrations of some of the presently preferred embodiments of this invention. Various other embodiments and ramifications are possible within it's scope. For example, The feeder can consist of any number of food storage compartments in various sizes And various configurations including a singular compartment and feed door or Multiple compartments and feed doors. Multiple individual feeding units can be installed at different stalls, pens, corrals or barns and be controlled by a single Control panel or individual control panels. Due to the independent operation of the feed dispensing doors it is possible to manufacture the feeder in a modular fashion, thus further reducing manufacturing costs due to set up, tooling and inventory costs. This also makes it practical to add a feeder module to an existing unit if the consumer requires additional capacity.

Thus the scope of the invention should be determined by the appended claims and their legal equivalents, rather than by the examples given.

What is claimed is:

1. A machine for storing and automatically dispensing a premeasured quantity of hay, grain, pellets or other granular type diet supplements either together or separately to single or multiple livestock type animals at predetermined times, comprising: an enclosure containing a supporting structure and a plurality of compartments each compartment having the capacity of storing an amount of food for one feeding for either a single animal or multiple animals and being accessible for loading of feed by means of a vertical door; a plurality of horizontally mounted doors, one per compartment are affixed to the supporting structure at one end of each horizontal door by means of a hinged joint, opposite of the hinged joint a spring loaded latch bolt mechanism is affixed to each horizontally mounted door, the hinged joint allows the horizontally mounted door to rotate at a hinged pivot joint and fall by gravity into a vertical position allowing feed to fall into an integral hayrack consisting of vertically mounted rods or tubes located directly below the enclosure and a trough running the length and width of the enclosure, the hayrack and trough being elevated above the ground surface and act to capture, retain and distribute the feed, preventing contamination from dirt, sand or water while facilitating the feeding of multiple animals simultaneously by preventing hoarding of food by a more dominant animal; a means of unlatching the horizontally mounted doors electrically, utilizing an electric door opener affixed to the enclosure or supporting structure at each horizontally mounted door position, aligned as to mate with a latch bolt attached to each aforementioned horizontally mounted hinged door, which when energized allows the door strike of each electric door opener to pivot free from a closed position allowing each horizontally mounted door to swing past the strike into a vertical position thereby dispensing the feed; a means of setting and controlling the timing and sequencing of the opening of the feed dispensing horizontalyy mounted doors automatically on a selected predetermined feeding schedule utilizing electronic timers, electromechanical timers or a solid state programmable logic controller that is preprogrammed with a menu of feeding schedule options selected by the animal owner by means of a selector switch.

* * * * *